(12) United States Patent
Sze et al.

(10) Patent No.: US 11,492,766 B2
(45) Date of Patent: Nov. 8, 2022

(54) METHOD OF HOT RECYCLING REPAIRING BY OPTIMIZING PROPORTION OF ASPHALT MIXTURE ON PAVEMENT ALIGNMENT VARIATION SECTION

(71) Applicant: FREETECH THERMAL POWER CO.,LTD, Nanjing (CN)

(72) Inventors: Wai Pan Sze, Hong Kong (CN); Yifu Zhang, Nanjing (CN); Kai King Chan, Nanjing (CN); Min Chen, Nanjing (CN); Wei Zhu, Nanjing (CN); Quan Niu, Nanjing (CN)

(73) Assignee: FREETECH THERMAL POWER CO., LTD, Nanjing (CN)

( * ) Notice: Subject to any disclaimer, the term of this patent is extended or adjusted under 35 U.S.C. 154(b) by 108 days.

(21) Appl. No.: 16/766,708

(22) PCT Filed: Jul. 10, 2019

(86) PCT No.: PCT/CN2019/095470
§ 371 (c)(1),
(2) Date: May 25, 2020

(87) PCT Pub. No.: WO2020/211199
PCT Pub. Date: Oct. 22, 2020

(65) Prior Publication Data
US 2022/0106746 A1  Apr. 7, 2022

(30) Foreign Application Priority Data

Apr. 15, 2019  (CN) .......................... 201910298261.9

(51) Int. Cl.
*E01C 23/00* (2006.01)
*E01C 23/07* (2006.01)
(Continued)

(52) U.S. Cl.
CPC .............. *E01C 23/07* (2013.01); *E01C 7/187* (2013.01); *E01C 19/1004* (2013.01)

(58) Field of Classification Search
CPC ....... E01C 7/187; E01C 19/1004; E01C 23/07
(Continued)

(56) References Cited

U.S. PATENT DOCUMENTS

2003/0007835 A1* 1/2003 Jurshak ................. E01C 23/094
404/112
2010/0041795 A1* 2/2010 Wilson, Jr. ............. E01C 19/45
404/75
(Continued)

*Primary Examiner* — Raymond W Addie
(74) *Attorney, Agent, or Firm* — ROI Intellectual Property US; Klaus Michael Schmid

(57) ABSTRACT

The present invention discloses a method of hot recycling repairing by optimizing a proportion of an asphalt mixture on a pavement alignment variation section. According to the method of the present invention, by regulating and optimizing the proportion of a recycled asphalt mixture, internal frictional resistance and cohesion of the recycled asphalt mixture are improved, elastic modulus and shear strength of the recycled asphalt mixture are increased, overall bearing capacity of an asphalt pavement is improved, and diseases such as tracks caused by vehicle loads are effectively resisted. The pavement asphalt mixture is made to adapt to and be enough to bear additional loads increased manifold without generating early defects and road diseases. Therefore, the overall service life of a road is further prolonged.

1 Claim, 2 Drawing Sheets

(51) Int. Cl.
   *E01C 7/18* (2006.01)
   *E01C 19/10* (2006.01)

(58) Field of Classification Search
   USPC .............................................. 404/72, 75, 111
   See application file for complete search history.

(56) References Cited

U.S. PATENT DOCUMENTS

2013/0195551 A1* 8/2013 McDade .................. E01C 7/24
                                                        404/75
2014/0234027 A1* 8/2014 Morris .................. C08L 95/005
                                                        524/60
2016/0160453 A1* 6/2016 Donelson ................ E01C 19/16
                                                        404/82
2019/0152850 A1* 5/2019 Warner ................. C08L 91/005

* cited by examiner

METHOD OF HOT RECYCLING REPAIRING BY OPTIMIZING PROPORTION OF ASPHALT MIXTURE ON PAVEMENT ALIGNMENT VARIATION SECTION

BACKGROUND

Technical Field

The present invention relates to a method of hot recycling repairing of damaged asphalt mixtures on asphalt pavements, in particular to a method of hot recycling repairing by optimizing a proportion of an asphalt mixture on a pavement alignment variation section.

Related Art

On straight alignment sections, wheels apply force with positive stress playing a leading acting force and shear acting force playing an auxiliary role on pavements. For the same road or the same construction bid-section, even if transportation conditions and environment conditions of the road are the same, shear stress and transverse force which are generated by the traction force effect of tires and borne by pavement materials and structural layers are quite high on sections where road plane alignment or vertical alignment changes, such as road plane-to-bend sectors, connection turning sectors between primary runways and taxiways of airports, uphills and downhills of roads, uphill-downhill and turning combination sectors and other special sectors, as well as on special road sections where vehicle running states greatly change, such as signal-light-waiting sides at driving-in ends of urban road level crossings, continuous long uphill sections and sectors where heavy vehicles need to be shifted down to pass. Moreover, shear stress plays the leading role, and positive stress plays the auxiliary role. Therefore, even on the same bid-section of a road and even road structure design, road materials and construction processes are identical, due to giant differences of using conditions, early road diseases and defects of different degrees will appear in the service life cycles of different sections, permanent plastic deformation will occur too early especially on the alignment variation sections and portions, and consequently tracks, upheavals and translation diseases are caused.

In most traditional asphalt pavement repairing processes, pavement materials of original road sections with defects or damage are milled and re-laid for repairing, or a hot recycling method is adopted for local repairing. All the methods completely adopt new asphalt mixtures with a standard proportion in original pavement design.

Due to the fact that on special road sections where pavement alignment changes in the plane or the vertical direction and at driving-in ends of level crossings, stress on pavement materials is complex and asphalt mixtures with the standard proportion on pavements cannot bear various additional loads which increase manifold, early diseases are unavoidable when the pavements of the special road sections cannot reach the designed service life. Damage of the same property will appear soon after the pavements are repaired by adopting the traditional processes and the asphalt mixtures with the same specifications and types as original pavements.

SUMMARY

The technical problem to be solved by the present invention is to overcome defects in the prior art, and provide a method of hot recycling repairing by optimizing a proportion of an asphalt mixture on a pavement alignment variation section. The method is to repair alignment variation damage on an asphalt pavement with an optimized recycled asphalt mixture and an in-place hot recycling process. According to the method of the present invention, by regulating and optimizing a proportion of the recycled asphalt mixture, internal frictional resistance and cohesion of the recycled asphalt mixture are improved, elastic modulus and shear strength of the recycled asphalt mixture are increased, and pavement asphalt mixtures on special road sections are made to adapt to and be enough to bear additional loads increased manifold without generating early defects and road diseases. The service life of pavements on the special road sections is prolonged, and equivalently the overall service life of roads is prolonged.

To achieve the objective of the present invention, a provided technical solution is that the method of hot recycling repairing by optimizing the proportion of the asphalt mixture on the pavement alignment variation section includes the following steps:

Step 1, sampling a pavement material of an alignment variation section to be repaired to obtain asphalt mixture samples, where sampling is carried out by simulating intermittent heating and raking modes during in-place hot recycling construction, namely original pavement asphalt mixtures cannot be overheated and aggregates in the mixtures cannot be smashed in a sampling process;

Step 2, performing experimental analysis on the asphalt mixture samples to determine asphalt content (bitumen-aggregate ratio) and mineral aggregate gradations (distribution proportional values of all grain sizes) of an original pavement asphalt mixture;

Step 3, calculating an adding thickness N of a new asphalt mixture and a loose paving coefficient of the recycled asphalt mixture;

Step 3.1, measuring an average track depth $h_{left}$ of a left wheel path and an average track depth $h_{right}$ of a right wheel path of a driving lane of the alignment variation section to be repaired on site, where an average track depth h of the section is equal to $(h_{left}+h_{right})/2$;

Step 3.2, measuring a repairing paving length L, a lane width W, a paving depth H and an average overlaying thickness ΔH (namely an actual paving depth H+ΔH) of the alignment variation section to be repaired on site, and measuring a new asphalt mixture utilization rate δ;

Step 3.3, calculating the adding thickness N of the new asphalt mixture, where according to analysis, the average overlaying thickness ΔH and the average track depth h are directly proportional, so that a coefficient $K_1$ is determined according to $$K_1 = \delta \times \Delta H / h,$$

and the adding thickness N of the new asphalt mixture is: $N = K_1 \times \Delta H$;

Step 3.4, determining the loose paving coefficient of the recycled asphalt mixture, where a loose paving coefficient of the original pavement asphalt mixture is $\gamma_1$, a loose paving coefficient of the new asphalt mixture is $\gamma_2$, and the loose paving coefficient γ of the recycled asphalt mixture (a loose paving coefficient of the new recycled asphalt mixture) of the alignment variation section to be repaired is calculated according to $$\gamma = \gamma_1 + a \times N,$$

where $a = (\gamma_2 - \gamma_1)$;

Step 4, supplementing aged asphalt (asphalt in an old asphalt mixture of the pavement) with light oil, aromatic hydrocarbon and aromatics, adding a recycling agent into the aged asphalt according to asphalt grades to enable a penetration degree index of the aged asphalt to be restored to 80% of original asphalt performance, and determining an optimum usage amount of the recycling agent;

Step 5, determining an optimum bitumen-aggregate ratio, where according to results of a Marshall stability test, relation curves of stability, flow values, air voids, voids filled with asphalt and bitumen-aggregate ratios are respectively drawn, four bitumen-aggregate ratios corresponding to a maximum density, maximum stability, an air void range mid-value and an asphalt void-filled-with-asphalt range mid-value are found out from the curves, and an average value of the four bitumen-aggregate ratios is determined as an initial value $OAC_1$ of the optimum bitumen-aggregate ratio; but if no peak value appears in a bitumen-aggregate ratio range, density or stability selected for the test, the bitumen-aggregate ratio corresponding to a target air void may be directly used as the $OAC_1$; and a bitumen-aggregate ratio range ($OAC_{max}$, $OAC_{min}$) meeting all index requirements of asphalt concrete is determined by plotting, a mid-value of which is $OAC_2$, and if the initial value $OAC_1$ of the optimum bitumen-aggregate ratio is between $OAC_{max}$ and $OAC_{min}$, it is determined that a design result is feasible, and a mid-value of the $OAC_1$ and the $OAC_2$ may be used as the optimum bitumen-aggregate ratio OAC of a target proportion, so that the optimum bitumen-aggregate ratio is finally obtained;

Step 6, adding the new asphalt mixture into the old asphalt mixture according to parameters determined in steps 1-5, and preparing the recycled asphalt mixture by blending and mixing; adding a high-modulus agent into the recycled asphalt mixture to improve the elastic modulus and the shear strength, where an adding amount of the high-modulus agent is 3‰-5‰ of mass of the recycled asphalt mixture;

and detecting volume indexes (VV, VMA and VFA), dynamic properties and pavement performance indexes (RD, bending deformation and water stability) of the recycled asphalt mixture to meet design requirements; and Step 7, spreading and rolling the recycled asphalt mixture to form a new pavement by adopting the in-place hot recycling process.

The method of the present invention is adopted for the special road sections where asphalt pavement alignment changes and early damage occurs, the asphalt mixture with the optimized proportion is evenly mixed with the recycling agent and the high-modulus agent to increase an internal frictional resistance angle to the maximum extent while guaranteeing stability of the asphalt mixture, and the elastic modulus and the shear strength of the recycled asphalt mixture with the optimized proportion are improved, which may effectively prevent early damage of pavements of the special road sections with pavement alignment variation, improve service quality of the pavements of the special road sections and prolong the service life.

DETAILED DESCRIPTION

Figure 1:
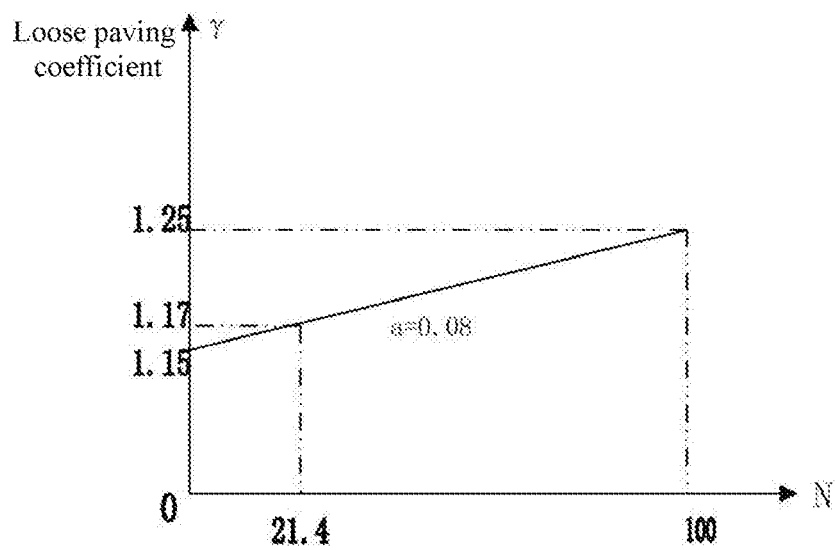
FIG. 1 is a relational diagram of a loose paving coefficient of a recycled asphalt mixture and a loose paving coefficient of an original pavement asphalt mixture of a road section as well as a loose paving coefficient of a new asphalt mixture determined by the adding amount of the new asphalt mixture.

The method of the present invention may be further described in detail with reference to the following embodiments.

Embodiment

A pavement to be repaired is selected.

(I) Materials of a pavement to be repaired are sampled to obtain asphalt mixture samples: sampling is carried out by simulating intermittent heating and raking modes during in-place hot recycling construction, namely original pavement asphalt mixtures cannot be overheated and aggregates in the mixtures cannot be smashed in a sampling process.

(II) Experimental analysis is carried out on the obtained samples in combination with original designed proportion parameters of an asphalt mixture of the pavement to be repaired: a penetration degree, a softening point and a ductility value of asphalt are measured to evaluate the aging condition of original pavement asphalt. According to tests, the asphalt content (bitumen-aggregate ratio) and mineral aggregate gradations (distribution proportional values of all grain sizes) of an original pavement asphalt mixture are determined, and material compositions thereof are evaluated.

(III) According to the deformation amounts of pavement subsidence, track depths and translation and upheaval heights measured during on-site pavement patrol, the adding proportion of a new asphalt mixture is calculated, and the grain sizes and distribution proportions of aggregates of various grades in the added new asphalt mixture are further worked out.

(1) Construction conditions and relevant data are acquired:

According to early road condition survey, the average track depth heft of a left wheel path of a driving lane of the pavement to be repaired is equal to 10.0 mm, the average track depth $h_{right}$ of a right wheel path is equal to 11.6 mm, and the average track depth h of a road section is equal to 10.8 mm.

(2) On the road section, the paving length L is equal to 400 m, the lane width W is equal to 3.85 m, and the paving depth H is equal to 4 cm; 34.24 tons of asphalt mixtures are consumed in construction; and the average overlaying thickness ΔH is equal to 0.9 cm, and a new asphalt mixture utilization rate δ measured on site is 95%.

(3) The adding thickness of the new asphalt mixture is calculated:

according to analysis, the average overlaying thickness and the average track depth are directly proportional, so that an empirical coefficient $K_1$ is determined:

$K_1$=0.95*9 mm/10.8 mm=0.79;

and the compaction thickness of field construction aggregates is 4 cm, and accordingly the adding thickness of the new asphalt mixture is obtained:

$$N(cm)=K_1 \times \Delta H=0.79*0.9=0.71.$$

(4) The loose paving coefficient of a recycled asphalt mixture is determined according to the adding amount of the new asphalt mixture:

according to on-site measurement, the loose paving coefficient $\gamma_1$ of the original pavement asphalt mixture of the road section is equal to 1.17, the average overlaying thickness is equal to 0.9 cm, the new asphalt mixture utilization rate $\delta$ is equal to 95%, and the adding proportion N of the new asphalt mixture is equal to 21.4%;

Keeping the working condition of a paver and the field rolling condition constant, and under the conditions of no adding of a new asphalt mixture into the original pavement asphalt mixture in combination with the actual field construction temperature, the loose paving coefficient $\gamma_2$ is calculated to be approximately equal to 1.25 when the new asphalt mixture is completed used according to the condition of a laboratory Marshall compaction test;

And the loose paving coefficient $\gamma$ of the recycled asphalt mixture (the loose paving coefficient of a new recycled asphalt mixture) of an alignment variation section to be repaired is equal to $\gamma_1+a \times N=1.15$ (See FIG. 1).

(IV) The aging condition of asphalt is evaluated according to the penetration degree, an increasing value of the softening point and a decreasing value of the ductility of the asphalt, and a recycling agent is added according to the mass percentage of the content of aged asphalt: the aged asphalt is supplemented with light oil, aromatic hydrocarbon and aromatics to enable the performance of the aged asphalt to be restored to 80% of original asphalt. The final dosage of the recycling agent is determined.

(V) By combining technical parameters in design files and actual detection parameters of an original pavement, it is determined that the dosage of hot asphalt added into original pavement materials meets requirements of the designed optimum bitumen-aggregate ratio. With increasing of traffic and as high-temperature stability is higher than the standard requirement, it is required to be greater than 6,000 times per millimeter. A high-modulus agent is added while asphalt mixtures are recycled so as to improve elastic modulus and shear strength. The specific adding amount of the high-modulus agent is 3‰-5‰ of the mass of the recycled asphalt mixture.

(VI) After new additives (coarse, medium and fine gradation materials and corresponding bitumen-aggregate ratios) are selected according to the above measured parameters and are blended and mixed, volume indexes (VV, VMA and VFA), dynamic properties and pavement performance indexes (RD, bending deformation and water stability) of the recycled asphalt mixture are measured to meet requirements of the design files, and the bitumen-aggregate ratio and gradations of the added new asphalt mixture are determined.

Figure 2:
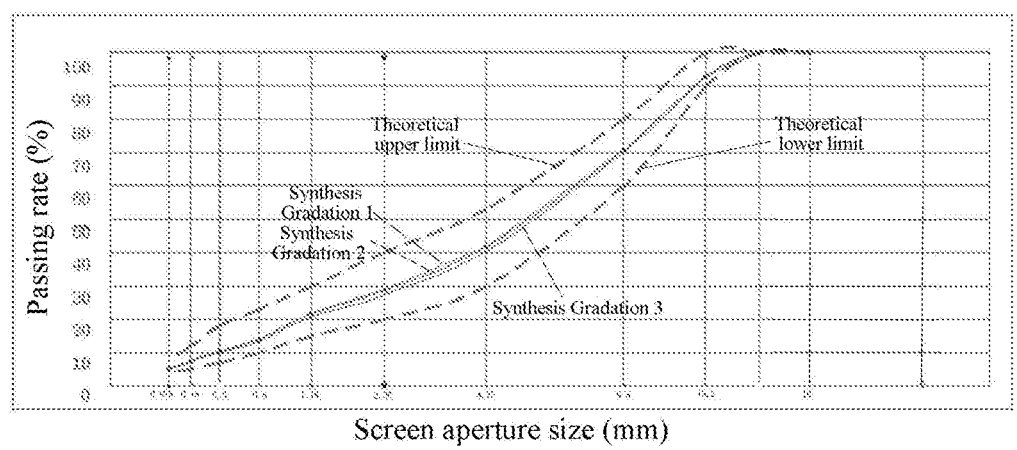
FIG. 2 is a graph of three testing gradations of an AK-13 type.

When aggregate gradations are selected, mineral aggregate gradations of the original pavement are improved by combining screening results of new aggregates, screening results obtained after extraction of the original pavement asphalt mixture and the new adding amount determined in the step 3. Firstly, fine, medium and coarse gradations (Gradation 1, Gradation 2 and Gradation 3) are primarily selected, Marshall testing pieces are respectively manufactured according to the determined parameters, volume indexes of the test pieces are obtained, and a group of gradations meeting or approximately meeting design requirements is primarily selected according to the volume indexes to serve as designed gradations. Mineral aggregate proportion detail tables of the three gradations are as follows, Table 1 is a synthesis gradation detail table of three mineral aggregates, and FIG. 2 is a graph of three testing gradations of an AK-13 type.

TABLE 1

Synthesis Gradation Passing Rate Detail Table of Three Mineral Aggregates

| Gradation type | Mass percentage (%) passing following screening holes (square-hole screens, mm) | | | | | | | | | |
|---|---|---|---|---|---|---|---|---|---|---|
| | 16.0 | 13.2 | 9.5 | 4.75 | 2.36 | 1.18 | 0.6 | 0.3 | 0.15 | 0.075 |
| Gradation 1 | 100.0 | 93.3 | 71.3 | 40.5 | 29.1 | 21.6 | 13.9 | 9.9 | 7.4 | 5.2 |
| Gradation 2 | 100.0 | 93.2 | 70.9 | 39.7 | 28.6 | 21.3 | 13.7 | 9.8 | 7.4 | 5.2 |
| Gradation 3 | 100.0 | 93.1 | 70.3 | 38.2 | 27.0 | 20.2 | 13.0 | 9.3 | 7.0 | 4.9 |

Testing Gradation Evaluation:

By reference to the previous engineering application condition of a target proportion of in-place hot recycling of the AK-13 type modified asphalt mixture on asphalt pavements of Jiangsu Province, the bitumen-aggregate ratio 4.80% is selected as the bitumen-aggregate ratio for designing the gradations, and the Marshall test pieces are formed by 75 times of compaction on each of two surfaces. Results of a Marshall test are collected in Table 2.

TABLE 2

Marshall Test Result Collection Table of Three Testing Gradations

| Volume index gradation | Bitumen-aggregate ratio after blending (%) | Bulk volume relative density of test pieces | Actually-measured theoretical maximum relative density | Air voids (VV) (%) | Voids in mineral aggregates (VMA) (%) | Voids filled with asphalt (VFA) (%) |
|---|---|---|---|---|---|---|
| Gradation 1 | 4.8 | 2.511 | 2.602 | 3.5 | 14.0 | 75.0 |
| Gradation 2 | 4.8 | 2.488 | 2.608 | 4.6 | 14.4 | 68.1 |

TABLE 2-continued

Marshall Test Result Collection Table of Three Testing Gradations

| Volume index gradation | Bitumen-aggregate ratio after blending (%) | Bulk volume relative density of test pieces | Actually-measured theoretical maximum relative density | Air voids (VV) (%) | Voids in mineral aggregates (VMA) (%) | Voids filled with asphalt (VFA) (%) |
|---|---|---|---|---|---|---|
| Gradation 3 | 4.8 | 2.464 | 2.616 | 5.8 | 14.9 | 61.1 |
| Technical requirements | / | / | / | 3-6 | / | 65-75 |

Note: It is required that minimum VMA values corresponding to air voids 4, 5 and 6 are respectively 14, 15 and 16, and when the air voids are not integers, a required minimum VMA value is determined through interpolation.

It can be seen from Table 2 that the volume index of the Gradation 2 meets the requirements, while the volume indexes of the Gradation 1 and the Gradation 3 do not meet the requirements, and in combination with local conditions and practice experience, the Gradation 2 is selected as the designed gradation in the design. Marshall stability test Blending is performed according to designed mineral aggregate proportions, the Marshall stability test is performed by adopting five bitumen-aggregate ratios, and test results are shown in Table 3.

TABLE 3

Results of Marshall Stability Test of AK-13 Designed Gradation

| Gradation type | Bitumen-aggregate ratio (%) | Bulk volume relative density of test pieces | Actually-measured theoretical maximum relative density | Air voids (VV) (%) | Voids in mineral aggregates (VMA) (%) | Voids filled with asphalt (VFA) (%) | Stability (KN) | Flow value (0.1 mm) |
|---|---|---|---|---|---|---|---|---|
| AK-13 | 3.8 | 2.485 | 2.649 | 6.2 | 15.0 | 58.6 | 8.27 | 18.3 |
|  | 4.3 | 2.488 | 2.630 | 5.4 | 14.8 | 63.4 | 9.60 | 21.7 |
|  | 4.8 | 2.494 | 2.610 | 4.5 | 14.7 | 69.5 | 10.42 | 25.5 |
|  | 5.3 | 2.493 | 2.592 | 3.8 | 15.0 | 74.6 | 9.25 | 29.1 |
|  | 5.8 | 2.491 | 2.574 | 3.2 | 15.3 | 79.1 | 8.63 | 32.9 |
| Requirements |  | / | / | 4-6 | * | 65-75 | ≥8 | 15-40 |

Note: It is required that minimum VMA values corresponding to air voids 4, 5 and 6 are respectively 14, 15 and 16, and when the air voids are not integers, a required minimum VMA value is determined through interpolation.

Determination of the optimum bitumen-aggregate ratio According to the results of the Marshall stability test, relation curves of stability, flow values, air voids, voids filled with asphalt and bitumen-aggregate ratios are respectively drawn, four bitumen-aggregate ratios corresponding to a maximum density, maximum stability, an air void range mid-value and an asphalt void-filled-with-asphalt range mid-value are found out from the curves, and an average value of the four bitumen-aggregate ratios is determined as an initial value $OAC_1$ of the optimum bitumen-aggregate ratio. However, if no peak value appears in the bitumen-aggregate ratio range, density or stability selected for the test, the bitumen-aggregate ratio corresponding to a target air void may be directly used as the $OAC_1$. A bitumen-aggregate ratio range ($OAC_{max}$, $OAC_{min}$) meeting all index requirements of asphalt concrete is determined by plotting, a mid-value of which is $OAC_2$, and if the initial value $OAC_1$ of the optimum bitumen-aggregate ratio is between $OAC_{max}$ and $OAC_{min}$, it is determined that a design result is feasible, and a mid-value of the $OAC_1$ and the $OAC_2$ may be used as the optimum bitumen-aggregate ratio OAC of a target proportion. The optimum bitumen-aggregate ratio is finally obtained by demonstrative taking in combination with local climate features and practical conditions.

It can be seen from diagrams that the asphalt contents a1, a2, a3 and a4 corresponding to the maximum density value, the maximum stability value, a target air void (or the mid-value) and the asphalt void-filled-with-asphalt range mid-value within a selected asphalt content range are respectively 4.8%, 4.8%, 4.8% and 4.82%, so that the $OAC_1$= (4.8%+4.8%+4.8%+4.82%)/4=4.8%. It can also be seen that the $OAC_{min}$ is equal to 4.45%, the $OAC_{max}$ is equal to 5.32%, the $OAC_1$ is within the range of $OAC_{min}$ to $OAC_{max}$, so that the $OAC_2$=(4.45%+5.32%)/2=4.9%. Usually, a mid-value of the $OAC_1$ and the $OAC_2$ is used as the calculated optimum asphalt content OAC, namely OAC=(4.8%+ 4.9%)/2=4.8%.

Figure 3:
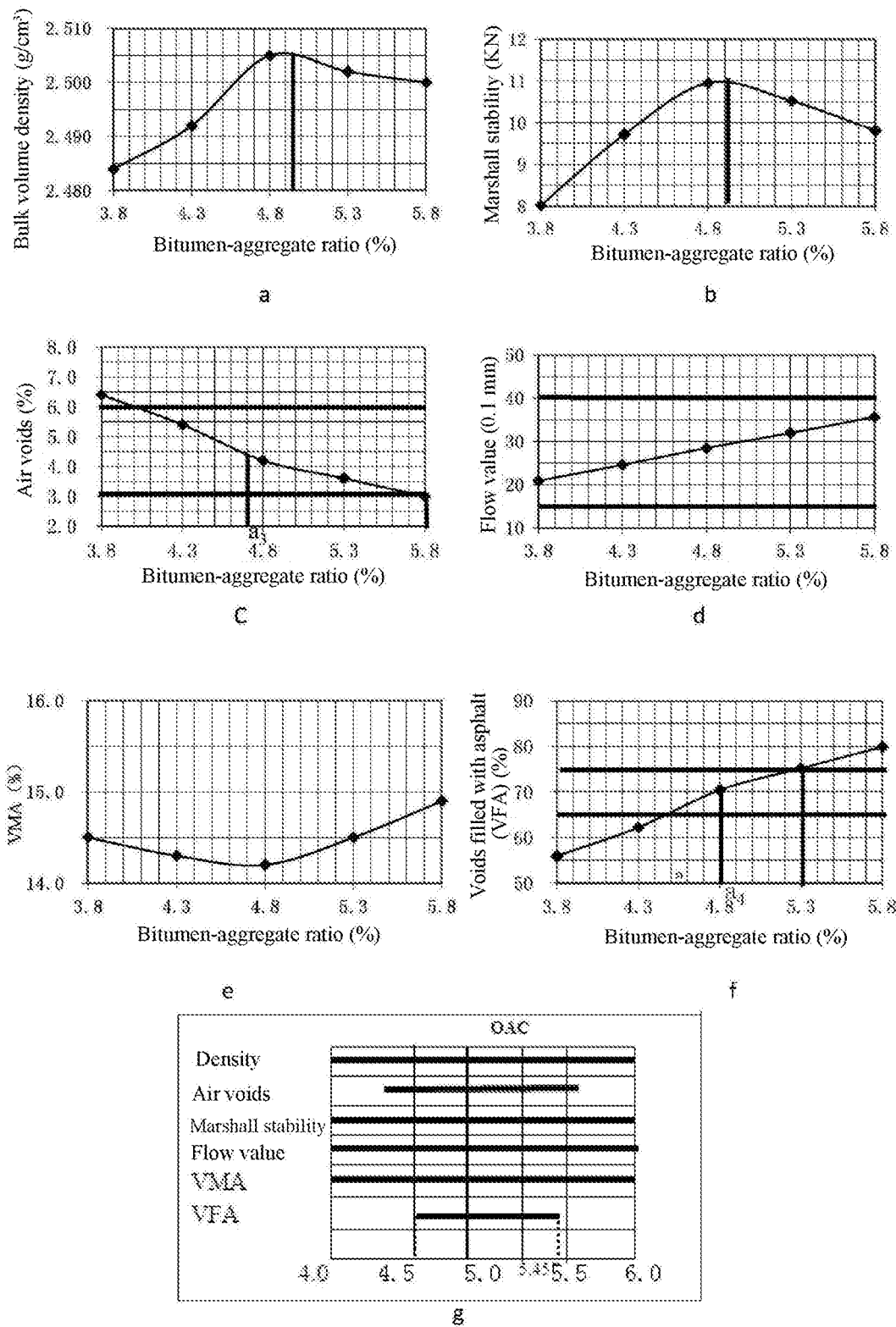
FIG. 3 is relational diagrams of stability, flow values, densities, air voids, voids filled with asphalt and VMA and bitumen-aggregate ratios, where Fig. a is a relational diagram of the densities and the bitumen-aggregate ratios, Fig. b is a relational diagram of the stability and the bitumen-aggregate ratios, Fig. c is a relational diagram of the air voids and the bitumen-aggregate ratios, Fig. d is a relational diagram of the flow values and the bitumen-aggregate ratios, Fig. e is a relational diagram of the VMA and the bitumen-aggregate ratios, Fig. f is a relational diagram of the voids filled with asphalt and the bitumen-aggregate ratios, and Fig. g is a bitumen-aggregate ratio selection diagram.

The relations of the stability, the flow values, the densities, the air voids, the voids filled with asphalt and the VMA and the bitumen-aggregate ratios are shown in FIG. 3.

Design Results

Through analysis according to the test, the Gradation 2 is selected as the designed gradation, the proportion of 1 #:2 #:3 #:4 #: original pavement asphalt mixture: mineral powder is 7.0:7.4:0.6:4.4:80.0:0.6, the bitumen-aggregate ratio is 4.8%, and corresponding asphalt mixture properties are shown in Table 4.

TABLE 4

Asphalt Mixture Volume Property Table

| Mixture features | Design results | Technical requirements |
|---|---|---|
| Bulk volume relative density of test pieces | 2.494 | / |
| Actually-measured theoretical maximum relative density | 2.610 | / |

TABLE 4-continued

Asphalt Mixture Volume Property Table

| Mixture features | Design results | Technical requirements |
|---|---|---|
| Air voids (VV) (%) | 4.5 | 3-6 |
| Voids in mineral aggregates (VMA) (%) | 14.7 | ≥14.2 |
| Voids filled with asphalt (VFA) (%) | 69.5 | 65-75 |
| $P_{be}$ (%) | 3.831 | / |
| $V_{be}$ (%) | 9.222 | / |
| $V_g$ (%) | 86.278 | / |
| Ratio of filler asphalt (DP) | 1.410 | Preferable 0.6-1.6 |
| DA (μm) | 5.603 | / |
| Marshall stability (MS) (KN) | 10.42 | ≥8 |
| Flow value (FL) (0.1 mm) | 25.5 | 15-40 |

In the table: $P_{be}$ denotes the effective asphalt content in the asphalt mixture, %
$V_{be}$ denotes the volume percentage of effective asphalt, %
$V_g$ denotes the volume percentage of mineral aggregates, %
DA denotes the effective thickness of an asphalt membrane, μm
Detection of the asphalt mixture a. Water Stability Detection An immersion Marshall stability test is performed according to the designed bitumen-aggregate ratio and gradation to detect water stability performance of the designed asphalt mixture. Test results are shown in Table 5 and Table 6.

TABLE 5

Immersion Marshall Stability Test Results

| Mixture type | Non-condition (0.5 h) | | | Condition (48 h) | | | Residual stability MS0 (%) | Requirements (%) |
|---|---|---|---|---|---|---|---|---|
| | Air voids (%) | Stability (KN) | Flow value (0.1 mm) | Air voids (%) | Stability (KN) | Flow value (0.1 mm) | | |
| AK-13 | 4.4 | 10.25 | 26.2 | 4.5 | 9.30 | 28.0 | 88.5 | ≥85 |
| | 4.4 | 10.96 | 25.7 | 4.5 | 10.02 | 27.5 | | |
| | 4.5 | 10.37 | 26.0 | 4.5 | 9.18 | 28.1 | | |
| Average | 4.4 | 10.53 | 26.0 | 4.5 | 9.50 | 27.9 | | | b. High-Temperature Stability Test

Test conditions: a track test is performed at 60.0° C. and under 0.7 MPa to detect high-temperature stability of the asphalt mixture, and results of a track test piece dynamic stability test are shown in Table 6.

TABLE 6

Track Test Dynamic Stability

| Mixture type | Bitumen-aggregate ratio after blending (%) | Dynamic stability (times/mm) | | | | | Variable coefficient (%) | Requirements (%) |
|---|---|---|---|---|---|---|---|---|
| | | 1 | 2 | 3 | Average | Requirements | | |
| AK-13 | 4.8 | 7530 | 7275 | 7462 | 7422 | ≥ | 3.9 | ≤20 |

(VII) The recycled asphalt mixture is spread and rolled to form a new pavement by adopting the in-place hot recycling process.

What is claimed is:

1. A hot regeneration repair method for repairing a road section having varying road-surface alignment by optimizing asphalt mixture ratio used in the method, comprising the following steps:

step 1, sampling a road-surface material on the road section to be repaired to obtain asphalt mixture samples, wherein said sampling is carried out by simulating intermittent heating and raking during in-situ hot regeneration;

step 2, performing test analysis on the asphalt mixture samples to determine asphalt content and mineral grades of the asphalt mixture originally using in the road surface;

step 3, calculating a thickness N of a new asphalt mixture to be added and a loose paving coefficient of a regenerated asphalt mixture; wherein said step 3 further comprises:

step 3.1, measuring an average rul depth $h_{left}$ of a left wheel track zone of the road section to be repaired and an average rut depth $h_{right}$ of a right wheel track zone of the road section to be repaired, calculating an average rut depth h of the road section to be equal to $(h_{left}+h_{right})/2$;

step 3.2, determining a length L, a lane width W, a paving depth H and an average additional paving thickness ΔH of the road section to be repaired, and determining a new-asphalt mixture utilization rate δ;

step 3.3, calculating the thickness N of the new asphalt mixture to be added by first calculating a coefficient $K_1$ according to $K_1=δ×ΔH/h$, and then obtaining the thickness N according to $N=K_1×ΔH$; and step 3.4, determining the loose paving coefficient of the regenerated asphalt mixture by using a loose paving coefficient $γ_1$ of the original road-surface asphalt mixture and a loose paving coefficient $γ_2$ of the new asphalt mixture $γ_2$ and calculating the loose paving coefficient γ of the regenerated asphalt mixture according to $γ=γ_1+a×N$, wherein $a=(γ_2-γ_1)$;

step 4, supplementing aged asphalt with light oil, aromatic hydrocarbon and aromatics, and adding a regenerant to the aged asphalt according to asphalt grading to enable a penetration index of the aged asphalt to be restored to 80% of a performance of the original asphalt;

step 5, determining an optimum asphalt-aggregate ratio by using the following method, respectively drawing relationship curves, according to results of a Marshall stability test, of stability and asphalt-aggregate ratio, flow values and asphalt-aggregate ratio, void ratio and asphalt-aggregate ratio, saturation and asphalt-aggregate ratio; identifying from the relationship curves four asphalt-aggregate ratio values respectively corresponding to a maximum stability, a maximum density, a medium void ratio, and a medium saturation range; calculating an average of the identified four asphalt-aggregate ratio values as an initial value $OAC_1$ of the optimum asphalt-aggregate ration wherein if no peak value appears in an asphalt-aggregate ratio range, density or stability selected for the Marshall stability test, using the asphalt-aggregate ratio corresponding to a target void ratio as the $OAC_1$; and determining an asphalt-aggregate ratio range ($OAC_{max}$, $OAC_{min}$) meeting all index requirements, determining a mid-value $OAC_2$ of the asphalt-aggregate ratio range, and if the initial value $OAC_1$ of the optimum asphalt-aggregate ratio is between $OAC_{max}$ and $OAC_{min}$, using a mid-value of the $OAC_1$ and the $OAC_2$ as the optimum asphalt-aggregate ratio OAC;

step 6, adding the new asphalt mixture into an aged asphalt mixture according to parameters determined in steps 1-5, and preparing a regenerated asphalt mixture by blending and mixing; and adding a high-modulus agent to the regenerated asphalt mixture, wherein the high-modulus agent is 3‰-5‰ of mass of the regenerated asphalt mixture; and step 7, using an in-situ hot regeneration process, spreading and rolling the regenerated asphalt mixture to form a new road surface.

\* \* \* \* \*